United States Patent [19]

Eck

[11] Patent Number: 4,685,480

[45] Date of Patent: Aug. 11, 1987

[54] COMBINED WASHER AND ASPIRATOR

[75] Inventor: Paul L. Eck, Deerfield, Ill.

[73] Assignee: Abbott Laboratories, Abbott Park, Ill.

[21] Appl. No.: 771,395

[22] Filed: Aug. 30, 1985

[51] Int. Cl.⁴ .............................................. B08B 3/02
[52] U.S. Cl. ..................... 134/182; 15/302;
15/304; 134/195; 134/198; 141/65; 141/91;
141/98; 141/244; 239/124; 239/600
[58] Field of Search ................ 134/94, 102, 114, 174,
134/182, 195, 198; 239/124, 125, 126, 127, 566,
600; 15/302, 304; 141/65, 66, 91, 98, 244, 245;
137/571; 222/143, 148

[56] References Cited

U.S. PATENT DOCUMENTS

| 2,549,092 | 4/1951 | Huber | 239/125 |
| 2,566,532 | 9/1951 | Olson | 239/125 |
| 2,697,636 | 12/1954 | Hahn | 239/125 |
| 3,949,771 | 4/1976 | Dodge et al. | 134/94 |
| 3,985,301 | 10/1976 | Tindall | 239/126 |
| 4,341,568 | 7/1982 | Christensen | 15/302 X |

FOREIGN PATENT DOCUMENTS

| 187387 | 10/1922 | United Kingdom | 239/124 |
| 912590 | 12/1962 | United Kingdom | 239/126 |

Primary Examiner—Philip R. Coe
Attorney, Agent, or Firm—Martin L. Katz; Margaret M. O'Brien

[57] ABSTRACT

An improved combined washer and aspirator device comprises improved tips, tip seals, reaction well seals and a frame. The improved device reduces the amount of manual dexterity required of a laboratory technologist to wash beads in reaction wells used in diagnostic immunoassays.

5 Claims, 4 Drawing Figures

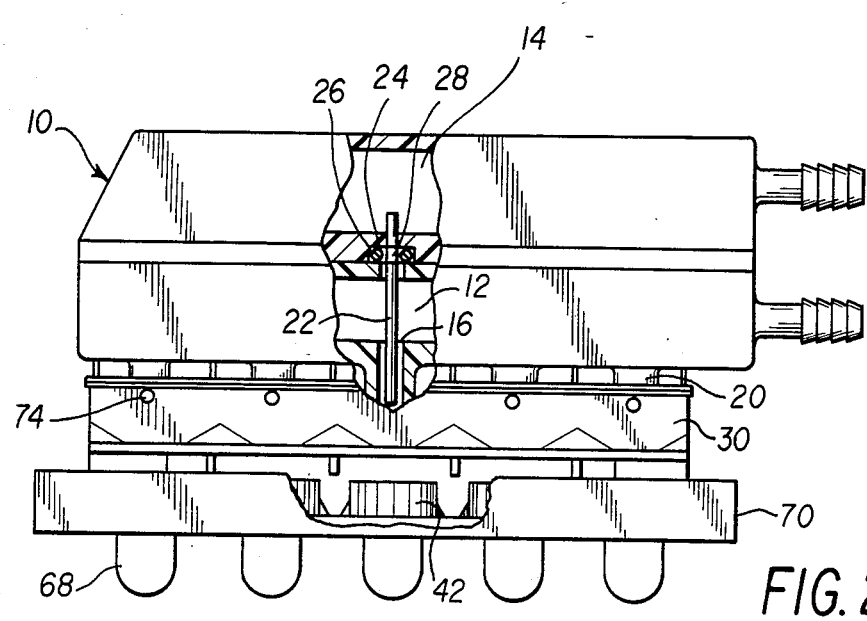
FIG. 2
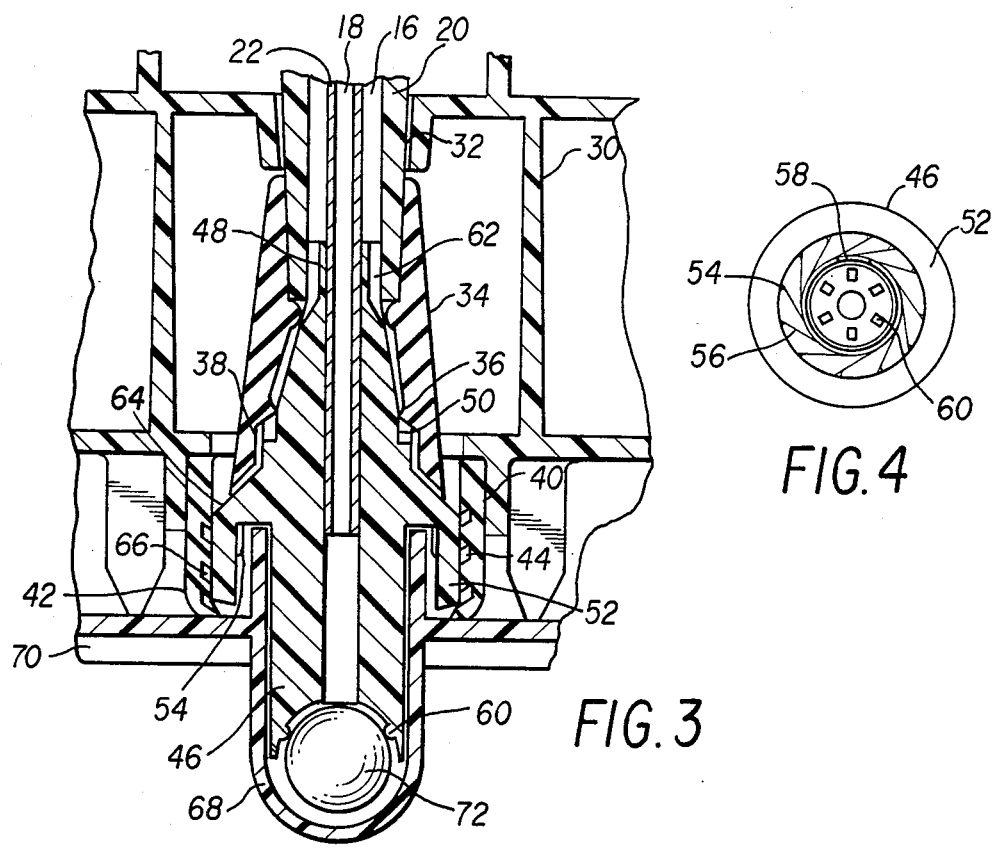
FIG. 3
FIG. 4

COMBINED WASHER AND ASPIRATOR

BACKGROUND OF THE INVENTION

This invention relates to an improved washer and aspirator device having improved tips, associated tip seals, reaction well seals and a frame. More particularly, this invention relates to an improved hand-held washer and aspirator device which is utilized in washing beads in reaction wells of diagnostic immunoassays.

Standard diagnostic immunoassays such as AUSRIA ® hepatitis radioimmunoassay and AUSZYME ® hepatitis enzyme immunoassay manufactured by Abbott Laboratories, North Chicago, Ill., contain a solid phase reagent such as a spherical polystyrene bead having an antigen or antibody coated thereon. This bead reagent is placed in a reaction well and is contacted with a human biological specimen such as a serum or urine suspected of containing an antigen or antibody to be detected in the immunoassay. After an incubation period, the human biological sample is separated from the bead by washing the bead and the reaction well, and then the wash solution and human biological sample are aspirated from the well. Next, a liquid reagent such as an antigen or antibody linked to an enzyme or radioisotopic label is added to the bead. These reagents are incubated, and then the solid phase is again washed and aspirated as described above to remove any unbound liquid reagent.

U.S. Pat. No. 3,949,771 describes a washer and aspirator device which delivers and removes wash solutions in assays such as those described above. These prior art washer and aspirator devices require careful manipulation including raising and lowering of the device in the reaction wells in precise timing with delivery and removal of wash solution to avoid splashing and incomplete washing of reaction wells. If, for example, the liquid reagent is inadvertently deposited at the top of the reaction well, it is difficult to remove this reagent using the prior art devices, and this extraneous liquid reagent will later interfere with assay results.

In particular, since enzyme immunoassays have gained increasing popularity over radioimmunoassays due to the lack of radioactive waste, the need for a less technique dependent method for washing beads in reaction wells has surfaced. A much smaller amount of extraneous liquid reagent in enzyme immunoassays may interfere with assay results as compared to radioimmunoassays.

SUMMARY OF THE INVENTION

The combined washer and aspirator device of the present invention comprises improved tips, tip seals, reaction well seals and a frame. The improved device enables the complete washing of beads and reaction wells and aspiration of liquid reagents and wash solution in an immunoassay, with no skilled technique required.

BRIEF DESCRIPTION OF THE DRAWINGS

A better understanding of the improvements to the combined washer and aspirator device will be accomplished by referring to the attached drawings in which:

FIG. 2 is a side view of the device in position for washing on a tray of reaction wells with a portion broken away;

FIG. 3 is an enlarged view in vertical section illustrating the device in operating position on a reaction well containing a bead; and FIG. 4 is an enlarged bottom view of the tip of the device.

DETAILED DESCRIPTION OF THE INVENTION

Figure 1:
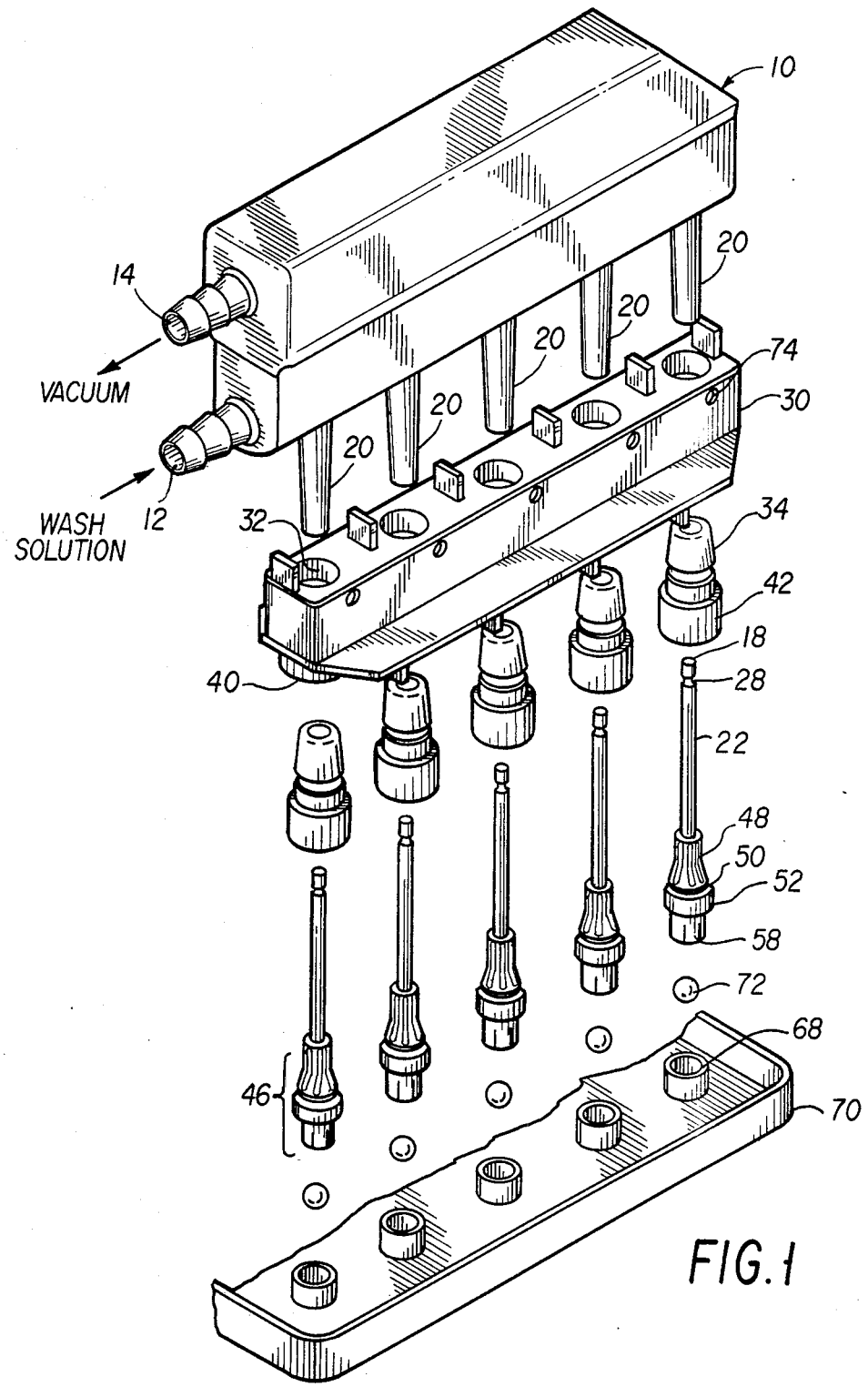
FIG. 1 is a perspective, exploded view of the improved, combined washer and aspirator device with beads and a tray of reaction wells.

As shown in FIGS. 1 and 2, the improved combined washer and aspirator device comprises a manifold assembly 10 having two independent parallel fluid passages 12 and 14. Parallel fluid passage 12 is connected to a pressurized wash solution source such as a pump for delivery of a wash solution. The other parallel fluid passage 14 is connected to a vacuum source for removal of liquid by aspiration.

As best seen in FIGS. 1, 2 and 3, the independent fluid passages 12 and 14 are connected to a multiplicity of individual outer concentric fluid passages 16 and inner concentric fluid passages 18, respectively, formed by outer tubular members 20 connected to the lower portion of manifold assembly 10 and inner tubular members 22. The inner tubular members 22 are easily insertable and removable from the manifold assembly 10 by means of insertion into or removal from O-rings 24 (FIG. 2) housed in compartments 26 between the parallel fluid passages 12 and 14. The inner tubular members have annular indentations 28 which mate with the O-rings 24. The O-rings 24 serve the dual function of retaining the inner tubular members 22 and sealing and separating parallel fluid passages 12 and 14.

A frame 30, having holes 32 in its upper portion which fit over the outer tubular members 20, is connected to the manifold assembly 10 by any suitable means such as welds, clamps or screws. Housed inside the frame 30 and surrounding the lower portion of outer tubular members 20, are tip seals 34. Each tip seal 34 comprises an annular seal lip 36 and tip seal grooves 38.

The lower portion of frame 30 further comprises openings 40 which house reaction well seals 42. Each reaction well seal 42 has spiral grooves 44.

The lower portions of the inner tubular members 22 comprise improved tips 46 which mate with reaction well seals 42, tip seals 34 and outer tubular members 20. As shown in FIGS. 1, 3 and 4, each tip 46 has tip grooves 48, a cylindrical portion 50, skirt 52, positioning means 54, deflecting means 56, a recessed portion 58 and protrusions 60.

As shown in FIG. 3, when tips 46 of inner tubular members 22 are mated with outer tubular members 20, tips seals 34, and reaction well seals 42, the following fluid channels are formed: flow-balancing channels 62, flow-distribution channels 64, and spiral channels 66. The flow-balancing channels 62 are formed when tips 46 are mated with outer tubular members 20. The flow-distribution channels 64 are formed by the mating of tips 46 with tip seal grooves 38 of the tip seals 34. The spiral channels 66 are formed by the mating of tips 46 with reaction well seals 42 when skirts 52 of tips 46 contact spiral grooves 44 of reaction well seals 42.

OPERATION

A better understanding of the improvements to the combined washer and aspirator device of the invention will be gained by a description of its operation.

First, a laboratory technologist places the improved hand-held device over an immunoassay reaction tray 70 which has a multiplicity of reaction wells 68 containing beads 72. The tips 46 of the device are placed down into the reaction wells 68, and reaction well seals 42, preferably manufactured from an elastomeric material such as rubber, seal around reaction wells 68 and against the tray 70. The technologist then initiates a wash cycle by activating the flow of wash solution into the parallel fluid passage 12 as by a pressurized source such as a pump (not shown). At the same time, parallel fluid passage 14 is connected to a suitable vacuum source. The wash solution flows into the parallel fluid passage 12, through outer concentric fluid passages 16 and through flow-balancing channels 62. The flow of wash solution through the flow-balancing channels 62 opens annular seal lip 36 of tip seals 34, preferably manufactured from an elastomeric material such as rubber, which enables wash solution to flow through flow-distribution channels 64 which evenly deliver wash solution to the entrances of spiral channels 66.

As vacuum is being constantly applied via parallel fluid passage 14 and through inner concentric fluid passages 18, atmospheric pressure present inside the frame 30 via vent holes 74, forces wash solution through the spiral channels 66, under the skirt 52 of tips 46, and into wells 68. There the wash solution is forced to flow around the beads 72 and back out of reaction wells 68 through inner concentric fluid passages 18 and parallel fluid passage 14 into an appropriate waste collection container (not shown). Protrusions 60 of the tips 46 hold beads 72 in a spaced manner away from tips 46 to allow flow of the wash solution around the beads 72. The spiral channels 66 in combination with deflecting means 56 provide even distribution of wash solution over the entire surface of the reaction wells 68 and beads 72.

Aspiration of the wash solution out of the reaction wells 68 is continued after removing the pressure source from parallel fluid passage 12, while vacuum is still being applied to parallel fluid passage 14 in communication with inner concentric fluid passages 18. In this manner, air at atmospheric pressure continues to flow through reaction wells 68 thereby capturing wash solution in the flow stream and purging reaction wells 68 of residual wash solution. The removal and aspiration of wash solution is further assisted by recessed portion 58 which enables a greater amount of air to flow into the reaction wells at that point thereby pushing wash solution from underneath beads 72.

The technique required of the operator of the improved combined washer and aspirator device is limited to placing the device into position over reaction wells of an immunoassay tray, maintaining contact of the reaction well seals to the tray during washing and aspiration, and removing the device from the reaction wells. No skilled manual dexterity is required during the wash.

The foregoing invention can now be practiced by those skilled in the art. Such skilled persons will know that the invention is not necessarily restricted to the embodiments presented. The scope of the invention is therefore to be defined by the terms of the following claims, as given meaning by the preceding description.

What is claimed is:

1. In a combined washer and aspirator device for washing beads in reaction wells of an immunoassay reaction tray, said device comprising a manifold assembly having two independent parallel fluid passages, one parallel fluid passage being connected to a pressurized wash solution source on one end and to a multiplicity of outer concentric fluid passages on the other end, and the other parallel fluid passage being connected to a vacuum source on one end and to a multiplicity of inner concentric fluid passages on the other end, the outer and inner concentric fluid passages being formed by a multiplicity of outer tubular members connected to the lower portion of the manifold assembly and easily insertable and removable inner tubular members held by O-rings in compartments between the two independent parallel fluid passages; the improvement wherein said device further comprises:
    (a) a frame fitting over said outer tubular members and connected to a lower portion of said manifold assembly, said frame having a multiplicity of openings therethrough;
    (b) reaction well seals housed within a lower portion of said openings in said frame, said reaction well seals contacting said reaction tray and sealing around said reaction wells; and
    (c) tips attached to a lower portion of said inner tubular members, said tips having a skirt portion, an upper portion of said tips mating with a lower portion of said outer tubular members to form flow-balancing channels, and the skirt portion of said tips mating with said reaction well seals to form spiral channels;
    wherein when wash solution passes through the multiplicity of outer concentric fluid passages into the flow-balancing channels, the fluid is evenly distributed among the spiral channels into the reaction wells.

2. The improved combined washer and aspirator device of claim 1 wherein said pressurized wash solution source is a pump.

3. The improved combined washer and aspirator device of claim 1 wherein the frame is connected to the manifold assembly by welds, clamps or screws.

4. The improved combined washer and aspirator device of claim 1 further comprising tip seals having annular seal tips, said tip seals housed within said frame and connected to said outer tubular members above said reaction well seals, said tip seals mating with said tips to form seals at said annular seal lips and to form flow distribution channels below said flow balancing channels, wherein said seals open under fluid pressure to enable wash solution to flow distribution channels which evenly distribute said wash solution to the entrances of said spiral channels over the entire surface of said reaction wells and beads.

5. The improved combined washer and aspirator device of claim 4 wherein the tip seals further comprise annular seal tips and tip seals grooves.

* * * * *